(12) United States Patent  
Ernst et al.

(10) Patent No.: US 7,029,322 B2
(45) Date of Patent: Apr. 18, 2006

(54) CONNECTOR PANEL MOUNT SYSTEM

(75) Inventors: Scot A. Ernst, Plainfield, IL (US); Ilya Makhlin, Wheeling, IL (US)

(73) Assignee: Molex Incorporated, Lisle, IL (US)

(*) Notice: Subject to any disclaimer, the term of this patent is extended or adjusted under 35 U.S.C. 154(b) by 74 days.

(21) Appl. No.: 10/935,768

(22) Filed: Sep. 8, 2004

(65) Prior Publication Data

US 2005/0058402 A1 Mar. 17, 2005

Related U.S. Application Data

(63) Continuation-in-part of application No. 10/797,431, filed on Mar. 10, 2004, now abandoned, which is a continuation of application No. 10/376,171, filed on Feb. 27, 2003, now Pat. No. 6,715,928.

(51) Int. Cl.
*H01R 13/73* (2006.01)
*H02B 1/01* (2006.01)

(52) U.S. Cl. .............................. 439/544; 385/56

(58) Field of Classification Search ........ 439/544–545, 439/552, 556, 559; 385/134–135, 53–54, 385/56; 277/602
See application file for complete search history.

(56) References Cited

U.S. PATENT DOCUMENTS

| 4,640,575 | A | * | 2/1987 | Dumas ........................ 385/134 |
| 5,021,009 | A | * | 6/1991 | Cox ............................ 439/538 |
| 5,238,426 | A | * | 8/1993 | Arnett ......................... 439/557 |
| 5,389,015 | A | * | 2/1995 | Sasai et al. .................. 439/752 |
| 5,600,746 | A | * | 2/1997 | Arnett .......................... 385/53 |
| 5,909,526 | A | * | 6/1999 | Roth et al. .................... 385/78 |
| 6,695,485 | B1 | * | 2/2004 | Estrella et al. ................. 385/53 |

* cited by examiner

*Primary Examiner*—Michael C. Zarroli
(74) *Attorney, Agent, or Firm*—Romi N. Bose

(57) ABSTRACT

An adapter assembly is provided for mounting in an opening in a panel. The assembly includes a permanent housing and a mounting bracket. The mounting bracket has latch arms for securing the permanent housing within the panel opening and mating arms for receiving an interchangeable housing to be mated with the permanent housing. A dust cap can be provided to protect the permanent housing when no interchangeable housing is mated to the permanent housing. The dust cap can also be used as a removal tool to remove an interchangeable housing from the permanent housing.

11 Claims, 9 Drawing Sheets

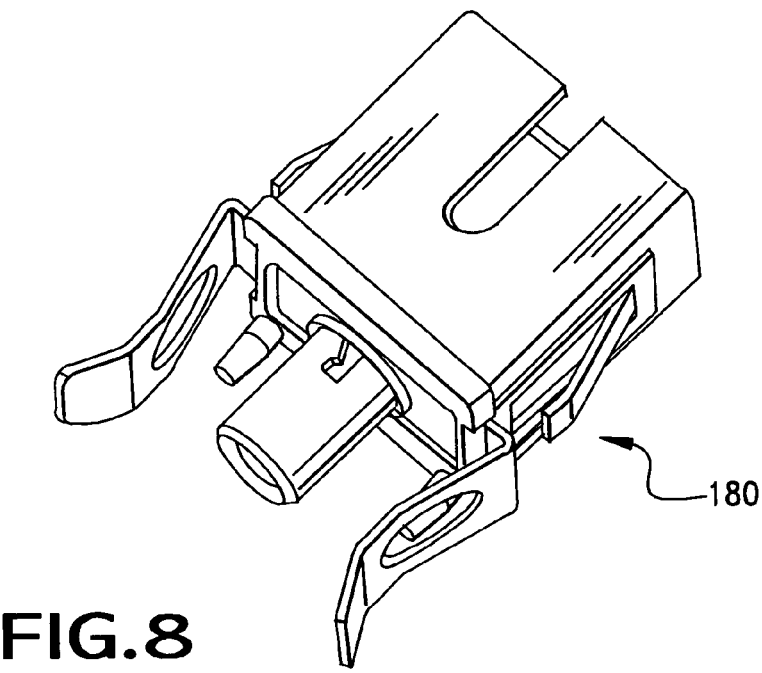
FIG. 8
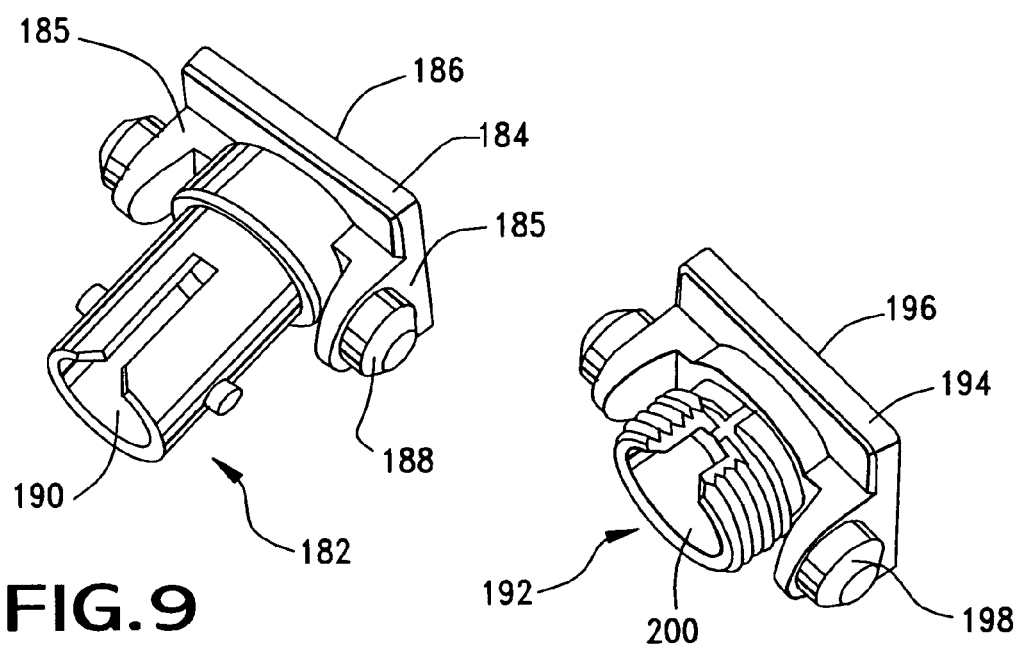
FIG. 9
FIG. 10

CONNECTOR PANEL MOUNT SYSTEM

RELATED APPLICATIONS

This application is a continuation-in-part patent application Ser. No. 10/797,431 filed on Mar. 10, 2004 now abandoned which is a continuation of patent application Ser. No. 10/376,171 filed on Feb. 27, 2003, now issued U.S. Pat. No. 6,715,928 issued on Apr. 6, 2004.

FIELD OF THE INVENTION

This invention generally relates to the art of fiber optic connectors, electrical connectors and other such connecting devices and, particularly, to a system for mounting connectors in an opening in a panel, circuit box, circuit board or other substrate. The invention also relates to a mounting plate which secures a permanent housing in an opening in a panel and also engages an interchangeable housing with the permanent housing.

BACKGROUND OF THE INVENTION

Fiber optic connectors, electrical connectors, adapters for such connectors and variety of other such connecting devices often are mounted within openings in a panel. The connecting interface of the connector, therefore, passes through the panel, i.e., from one side of the panel to the other. The panel may be a drawer panel, a box panel, a backplane panel, a circuit board or a variety of other planar substrates.

In addition, a pair of connectors or a connector and another transmission device often are mated in an adapter which centers the connectors. The adapter couples the connectors together in an in-line arrangement. The adapter may be designed for mounting in the opening in the panel, circuit board or other substrate, whereby one connector is inserted into the adapter from one side of the panel and another connector or other transmission device is inserted into the adapter from the opposite side of the panel.

Problems are encountered in mounting connecting devices through openings in panels where electromagnetic interference (EMI) is present. For instance, in a drawer panel, a box panel, a backplane panel or the like, all kinds of electrical circuitry may be disposed behind the panel (i.e., the opposite side of the panel) and it is desirable to prevent the electromagnetic interference from migrating through the connectors interface in the panel opening to the front side of the panel. If an adapter in an opening in a panel is fabricated of plastic material which has excellent wear characteristics, such as for allowing repeated mating and unmating of the connectors which typically are made of plastic materials, electromagnetic interference has a tendency of migrating directly through the plastic adapter. In order to provide EMI protection under such circumstances, it might be proposed to fabricate the adapter out of metal material, such as a diecast metal material. Unfortunately, such a metal adapter creates additional problems of creating plastic "dust" as a result of repeated mating and unmating cycles of a plastic connector with a metal adapter. It also might be proposed to plate a plastic adapter with metal material, but such metallization is expensive and the plating has a tendency to "flake-off" during repeated mating and unmating cycles, again creating undesirable plastic and metal dust. The present invention is directed to solving these problems by providing an adapter assembly or other receptacle which has a plastic part for receiving a repeatedly mateable connector, along with a metal part to provide EMI protection at the opening in the panel.

OBJECTS AND SUMMARY OF THE INVENTION

An object, therefore, of the invention is to provide a new and improved receptacle or adapter assembly for mounting in an opening in a panel.

In the exemplary embodiment of the invention, the receptacle or adapter assembly includes a housing mountable in the opening in the panel and including a pair of housing halves secured together at an interface. A first of the housing halves projects from one side of the panel and has a first receptacle for receiving at least one connector. The first housing half is fabricated of plastic material to withstand repeated insertions of the connector with a plastic housing into the receptacle. A second housing half projects from an opposite side of the panel and has a second receptacle for receiving a complementary connecting device for mating with the connector within the adapter assembly. The second housing half is fabricated of metal material to provide EMI protection at the opening in the panel.

As disclosed herein, the first housing half is unitarily molded of dielectric plastic material. The second housing half is fabricated of diecast metal material.

Other features of the invention include a snap-latch means between the pair of housing halves for securing the housing halves together. A latch also is provided on at least one of the housing halves for securing the adapter assembly in the opening in the panel. As disclosed herein, the latch is a metal latch and is a singular component having a pair of latch arms on opposite sides of the adapter assembly. At least one alignment sleeve spans the interface between the pair of housing halves, with opposite ends of the sleeve extending into a pair of aligned holes in the respective housing halves.

One additional feature of the invention includes use of different color plastic for molding the plastic half of the adapter to indicate the type of connector, e.g., single mode, APC etc., type of connector installed in the metal half of the adapter.

The invention also contemplates additional EMI protection by providing an EMI gasket about the adapter assembly and substantially surrounding the opening in the panel. As disclosed herein, the EMI gasket may be fabricated of metal material or foam with metal conductive fabric over it, or silicone with metal particles impregnated into it and is disposed about the second, metal half of the housing.

Another embodiment of the adapter assembly provides a mounting plate for mating permanent and interchangeable housings. The mounting plate secures the adapter assembly in an opening in a panel and secures the housings together. A dust cap is also provided. When an interchangeable housing is not mated with the permanent housing, the dust cap can be mated with the permanent housing. The dust cap can also be used as a tool for removing the interchangeable housing from the mounting plate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 8 is a perspective view of the base assembly portion of the adapter assembly of FIG. 5;

FIG. 9 is a perspective view of an interchangeable housing for mating with the base assembly of FIG. 8;

FIG. 10 is a perspective view of an interchangeable housing for mating with the base assembly of FIG. 8;

DETAILED DESCRIPTION OF THE ILLUSTRATED EMBODIMENTS

Figure 1:
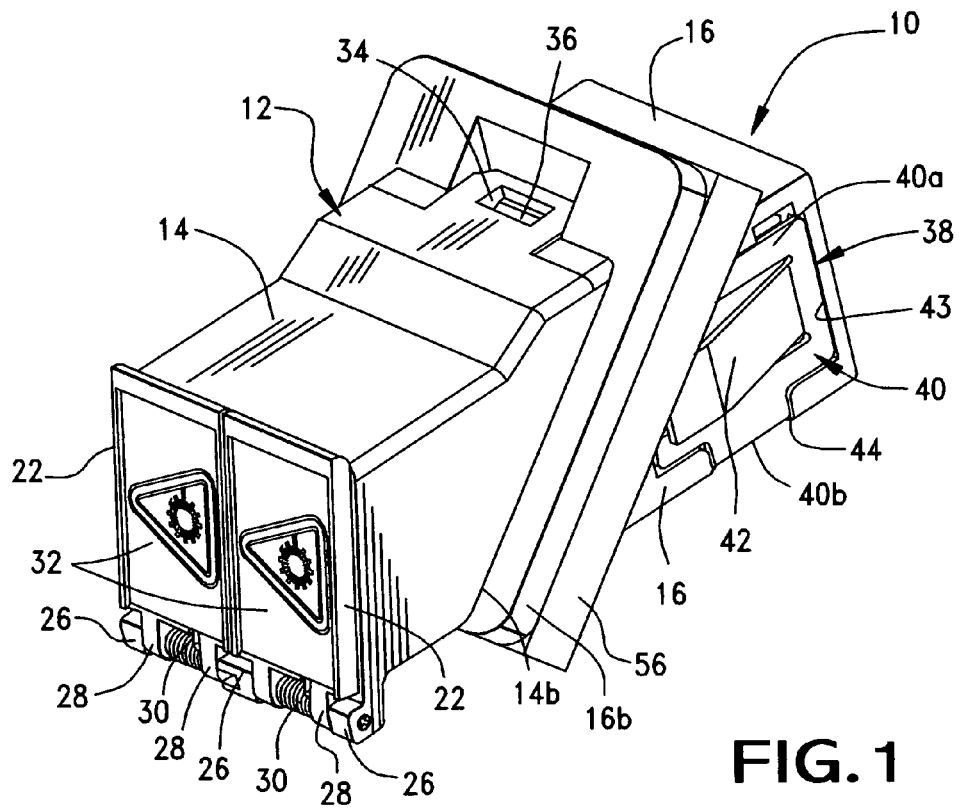
FIG. 1 is a front perspective view of a receptacle or adapter assembly embodying the concepts of the invention.

A first embodiment of the invention is shown in FIGS. 1–4 and a second embodiment of the invention is shown in FIGS. 5–15.

Referring to the drawings in greater detail, and first to FIGS. 1 and 2, the invention is illustrated in an adapter assembly, generally designated 10, for mounting in an opening in a panel shown in FIG. 3 and described hereinafter. The adapter assembly includes a housing, generally designated 12, which is mountable in the opening in the panel and which includes a pair of housing halves 14 and 16 which are connected together at an interface defined by an abutting interior wall 14a (FIG. 2) of housing half 14 and an interior wall 16a of housing half 16. A pair of alignment pins 18 (FIG. 2) project from interior wall 16a of housing half 16 into a pair of alignment holes (not visible in the drawings) in interior wall 14a of housing half 14.

At this point, it should be understood that, although adapter assembly 10 disclosed herein is a receptacle or adapter assembly for fiber optic connectors, the invention is equally applicable for a wide variety of "connector" applications wherein connectors or other transmission devices are mountable within or through panels. The concepts of the invention are equally applicable for electrical connectors or other such connecting devices, as well as fiber optic connectors, where EMI protection (as described in the "Background", above) is desirable or necessary.

In addition, while the two housing parts 14 and 16 are called housing "halves" herein, this term is used for simplicity purposes to provide a clear and concise understanding of the invention. Obviously, each housing half does not necessarily mean that each of the housing halves comprises "one-half" or 50% of the overall housing structure.

With those understandings, housing half 14 can be considered a front or first housing half in that it is located at the front of a panel, as described hereinafter. Front housing half 14 includes first receptacle means in the form of a pair of receptacles 20 (FIG. 2) for receiving a pair of fiber optic connectors. The receptacles normally are closed by a pair of shutter plates or doors 22 pivotally mounted to the bottom front edge of housing half 14 by a pivot pin 24 inserted through three journals 26 integral with the housing half and through two journals 28 at the bottom edge of each shutter plate. The shutter plates are biased to a closed position shown in FIG. 1 by a pair of torsion springs 30 wrapped about pivot pin 24. A pair of environmental labels 32 may be adhered to the outside face of shutter plates 22. The shutter plates are provided for preventing dust or dirt from entering receptacles 20 as well as for providing protection (such as for an operator's eyes) from radiation, such as laser beams, which might emanate out of the fiber optic connectors at the back side of the panel. Front housing half 14 has a pair of angled abutment surfaces 14b on opposite sides thereof. Finally, front housing half 14 has a top latch opening 34 and a pair of bottom latch openings (not visible in the drawings) for latching the two housing halves together, as will be described hereinafter.

Housing half 16 can be considered the second or rear housing half herein. The rear housing half has an outwardly projecting peripheral flange 16b which is angled and which abuts against angled abutment surfaces 14b of front housing half 14 when the housing halves are latched together as seen in FIG. 1. Rear housing half 16 includes a top chamfered latch boss 36 for snapping into top latch opening 34 of the front housing half to latch the housing halves together. In addition, a pair of bottom chamfered latch bosses 38 (only one being visible in the drawings) snap into the bottom latch openings of the front housing half when the two housing halves are latched together as seen in FIG. 1. Of course it is understood that other types of snap-latch structural arrangements may be used as well as, a press-fit between alignment pins 18 and alignment holes (not shown) or just by gluing together or welding with ultrasound to hold together the two housing halves.

Still referring to FIGS. 1 and 2, latch means, generally designated 38 in FIG. 1, is provided on rear housing half 16 for securing adapter assembly 10 in the opening in the panel, as will be described hereinafter. Specifically, the latch means includes a singular latch component, generally designated 40, which is stamped and formed of sheet metal material. Rear housing half 16 has a pair of shallow recesses 43 on opposite sides thereof and a shallow recess 44 in the bottom thereof. Metal latch 15 is generally U-shaped to define a pair of legs 40a joined by a cross brace 40b. A pair of deflectable latch arms 42 are formed out of legs 40a and are bent outwardly therefrom. When metal latch 40 is mounted on rear housing half 16 as shown in FIG. 1, legs 40a snap into recesses 43 in the sides of the housing half while cross brace 40b is disposed in recess 44 in the bottom of the rear housing half. It can be seen in FIG. 1 how latch arms 42 project outwardly from the sides of the rear housing half.

Figure 3:
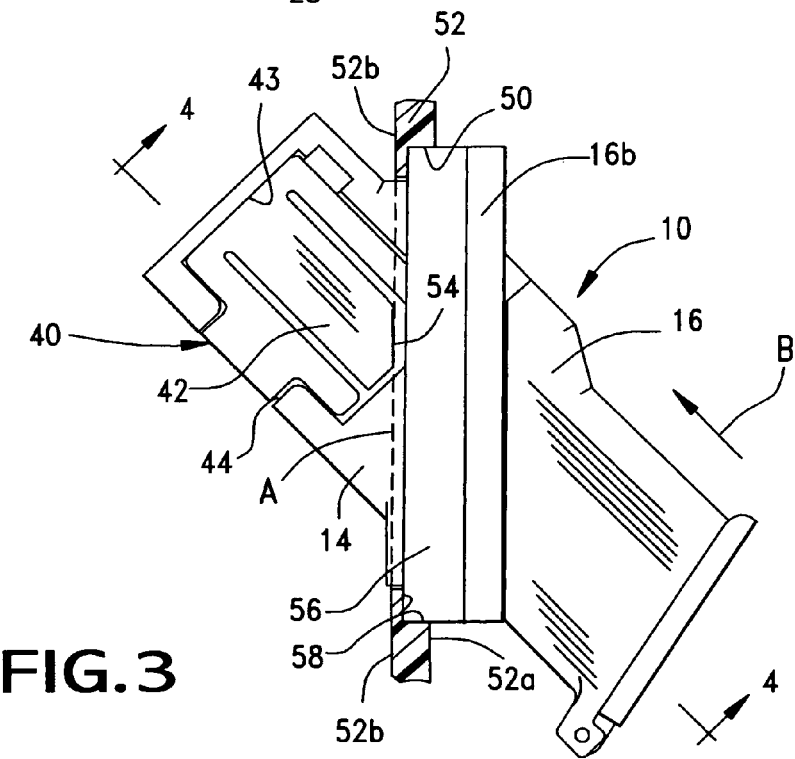
FIG. 3 is a side elevational view of the adapter assembly mounted in an opening in a panel.

FIG. 3 shows adapter assembly 10 mounted in an opening 50 in a panel 52. The panel has a front side 52a and a rear side 52b. Dotted line "A" represents the rear side of the panel at opposite sides of opening 50 which engages angled edges 54 of latch arms 42 which project outwardly from the adapter assembly. When the adapter assembly is inserted through opening 50 in panel 52 from front side 52a of the panel in the direction of arrow "B", deflectable latch arms 42 are biased inwardly until angled edges 54 clear rear side 52b of the panel, whereupon the deflectable latch arms snap back outwardly to secure the adapter assembly in the opening in the panel.

Figure 2:
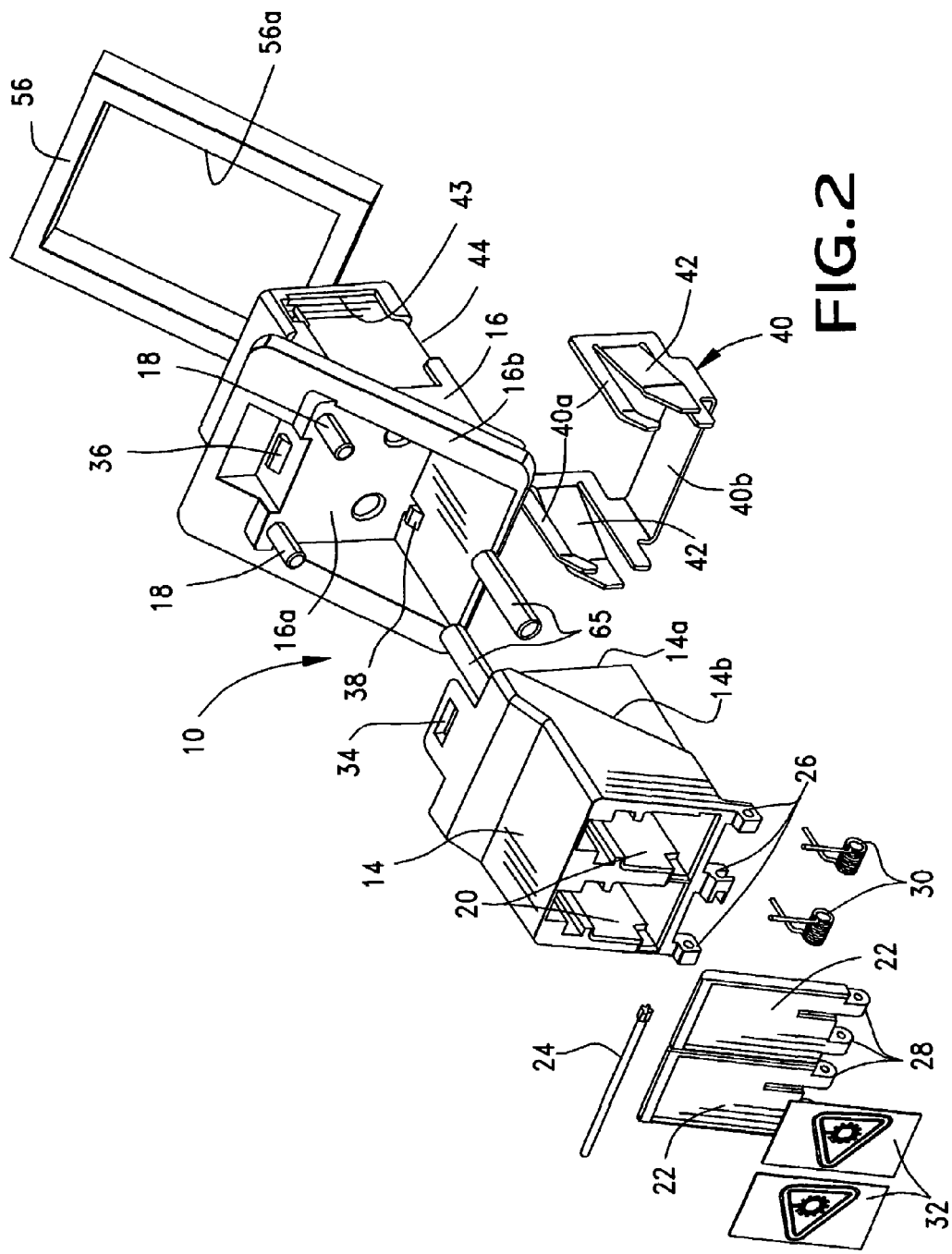
FIG. 2 is an exploded perspective view of the adapter assembly.

All of FIGS. 1–3 show a feature of the invention in providing a generally rectangular EMI gasket 56 which has an opening 56a (FIG. 2) conforming to the peripheral dimensions of rear housing half 16. The EMI gasket is positioned over the rear housing half and up against the rear face of angled flange 16b as seen in FIGS. 1 and 3. The EMI gasket substantially surrounds opening 50 in panel 52 as seen in FIG. 3, in order to prevent electromagnetic interference from leaking through the opening around the outside of the adapter assembly and also to ground the adapter to the panel. In fact, opening 50 can be cut-out or "stepped", as at 58 in FIG. 3, in order to tightly receive the EMI gasket about the opening in the panel.

According to the concepts of the invention, front housing half 14 is fabricated of plastic material in order to withstand repeated insertions of connectors into receptacles 20. In other words, the plastic material has wear characteristics which allows for repeated mating and unmating cycles of the connectors minimizing the plastic material flaking from the connector or the adaptor, or otherwise creating undesirable dust. The entire front housing half can be unitarily molded of dielectric plastic material or contain a plastic insert in metal.

With the front housing half fabricated of plastic material to withstand repeated interconnections, the invention contemplates that rear housing half 16 be fabricated of a metal material to provide EMI protection at opening 50 in panel 52. The rear housing half can be unitarily fabricated of diecast metal material. In a typical application of panel-mounted connectors, it is quite common that a receptacle assembly, such as adapter assembly 10, be used in applications where the rear side of the panel is enclosed and the connectors or other connecting devices inserted into rear housing half 16 are not repeatedly mated. Therefore, the problems of flaking or plastic dust actually is not an issue with the rear of the adapter assembly behind the panel where an operator rarely is required to mate connecting devices with the adapter assembly. Therefore, repeated mating and unmating cycles occur at the front of the panel where plastic housing half 14 is used.

Figure 4:
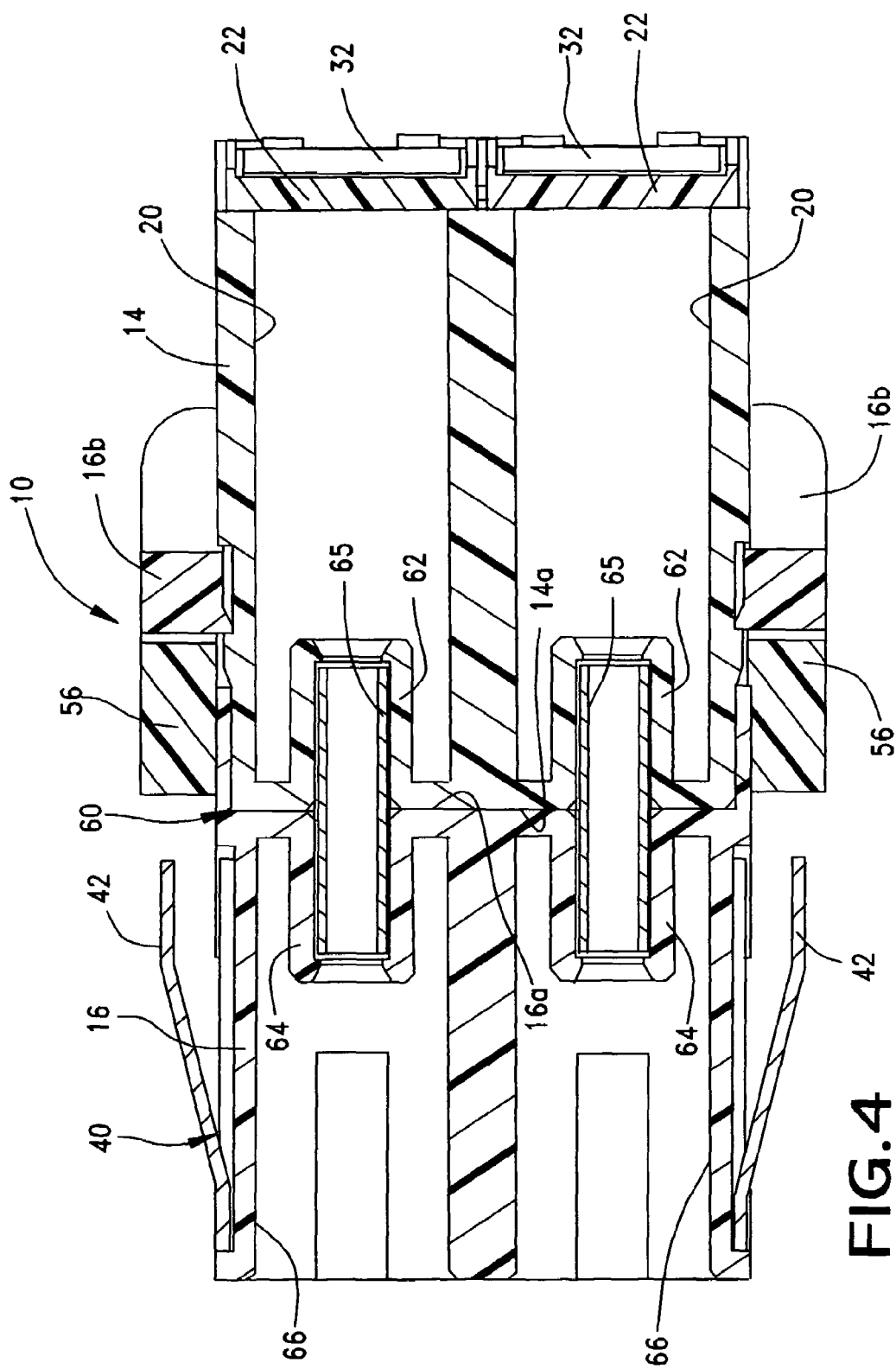
FIG. 4 is a section taken generally along line 4—4 of FIG. 3.

Finally, FIG. 4 is a section through the adapter assembly, generally along line 4—4 of FIG. 3. This depiction shows an interface, generally designated 60, between front housing half 14 and rear housing half 16 where interior walls 14a and 16a of the respective housing halves abut. These interior walls are provided with sockets 62 in the front housing half and sockets 64 in the rear housing half for receiving a pair of alignment sleeves 65 which are also shown in FIG. 2. FIG. 4 also shows that rear housing half 16 includes second receptacle means in the form of a pair of receptacles 66 generally aligned with receptacles 20 of the front housing half. With adapter assembly 10 being designed for fiber optic applications, a pair of fiber optic connectors or other optical fiber transmission devices (not shown) are inserted into receptacles 66. The connectors inserted into receptacles 20 and the connectors inserted into receptacles 66 have projecting ferrules which are aligned in alignment sleeves 65.

Figure 5:
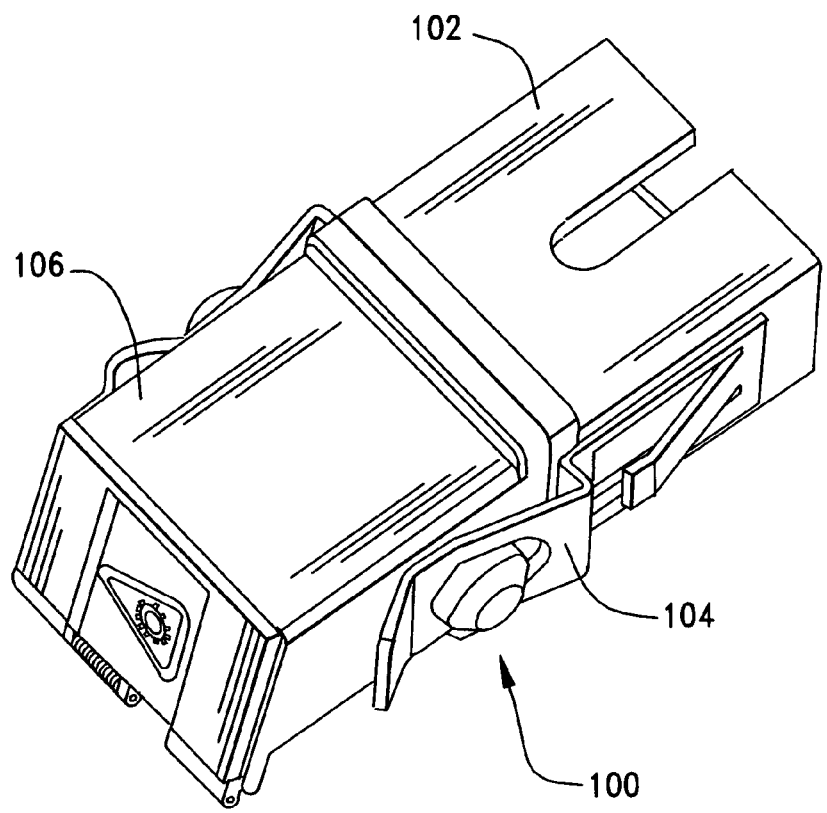
FIG. 5 is a front perspective view of an adapter assembly embodying the concepts of a second embodiment of the invention.

Attention is now invited to a second embodiment of the adapter assembly 100 shown in FIGS. 5–15. As shown in FIG. 5, the adapter assembly 100 generally includes a permanent or first housing 102, a mounting plate 104, and an interchangeable or second housing 106. It is to be understood that the adapter assembly is applicable for a wide variety of "connector" applications including electrical and fiber optical connectors.

Figure 6:
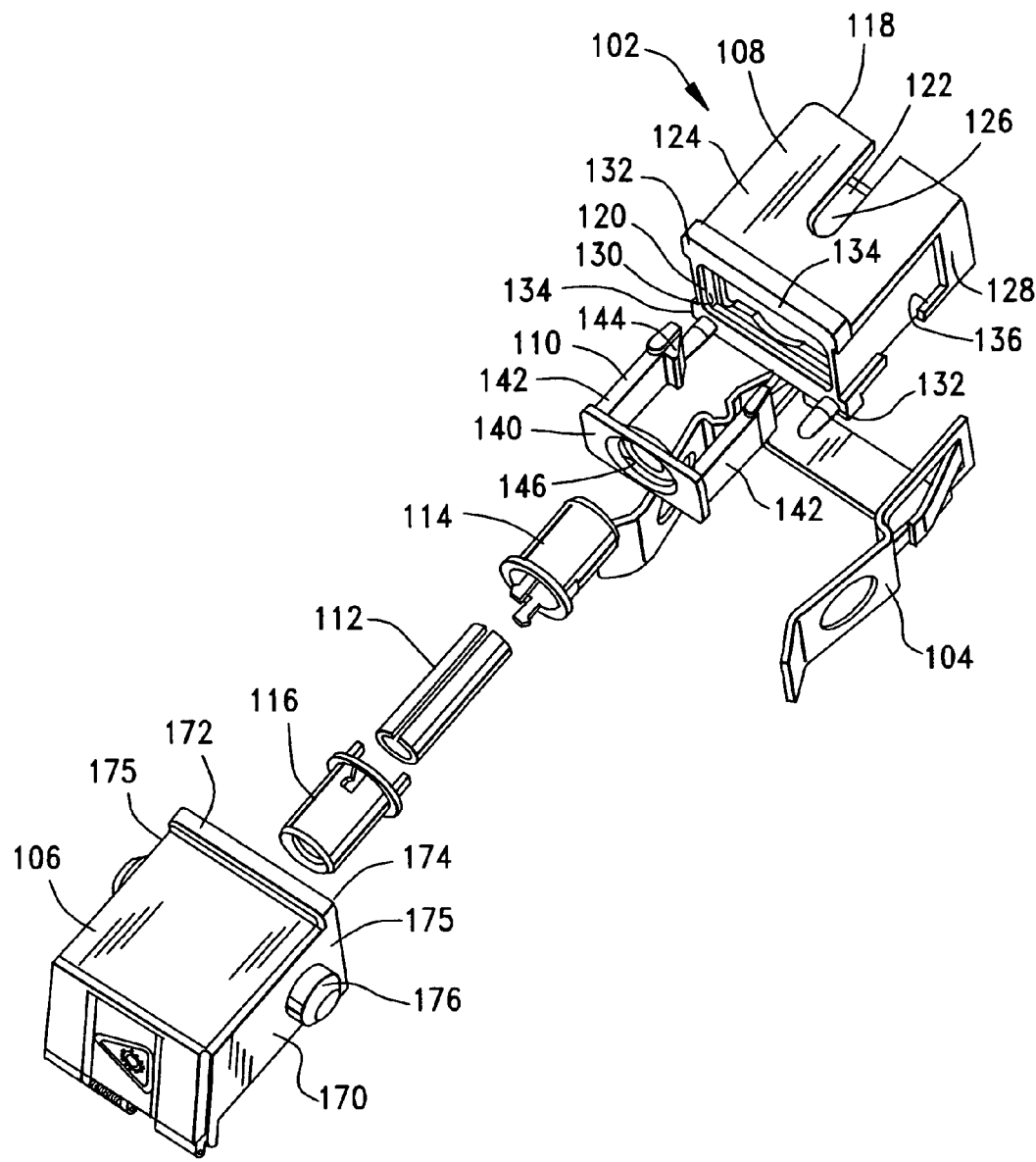
FIG. 6 is a front exploded perspective view of the of the adapter assembly of FIG. 5.

As shown in FIG. 6, permanent or first housing 102 generally includes a base 108, a spring lever 110, a split sleeve 112, a first sleeve holder 114, and a second sleeve holder 116.

The base 108 of the permanent housing 102 is generally tubular with a rectangular cross-section and includes a rear end 118 and a forward mating end 120. A receptacle 122 is provided for receiving a fiber optic connector and is generally defined by a top wall 124, a bottom wall 126, and two side walls 128 (one of which is shown). An aperture 130 is provided at the mating end 120 of the housing 102 and is in communication with the receptacle 122. Flanges 132 are provided above and below the aperture 130. The flanges 132 provide abutting surfaces 134 for mating the permanent and interchangeable housings 102, 106 as will be described herein. A recess 136 is provided in the exterior surface of each of the side walls 128 and a recess (not shown) is provided in the exterior surface of the bottom wall for receiving the mounting plate 104 in the same manner as described with respect to the embodiment of the invention shown in FIGS. 1–4. Preferably, the base 108 is die cast metal.

The spring lever 110 of the permanent housing 102 is generally U-shaped and includes a base 140 and two rearwardly projecting springs arms 142 at opposite ends of the base 140. Inwardly extending ears 144 are provided at the ends of the spring arms 142 for engaging a connector to be inserted in the receptacle 122 of the base 108. An aperture 146 is provided through the base 140. The spring lever 110 is positioned within the receptacle 122 of the base 108 such that the base 140 is positioned within the aperture 130 in the base member 108.

The split sleeve 112 is generally cylindrically-shaped and is supported within first and second split sleeve holders 114, 116 which are generally cylindrically-shaped. The first split sleeve holder 114 is positioned within the aperture 146 of the spring lever 110 and receives a first end of the split sleeve 112. The second split sleeve holder 116 is mounted on the opposite end of the split sleeve 112 and is received by the interchangeable housing 106 as will be described herein.

Figure 7:
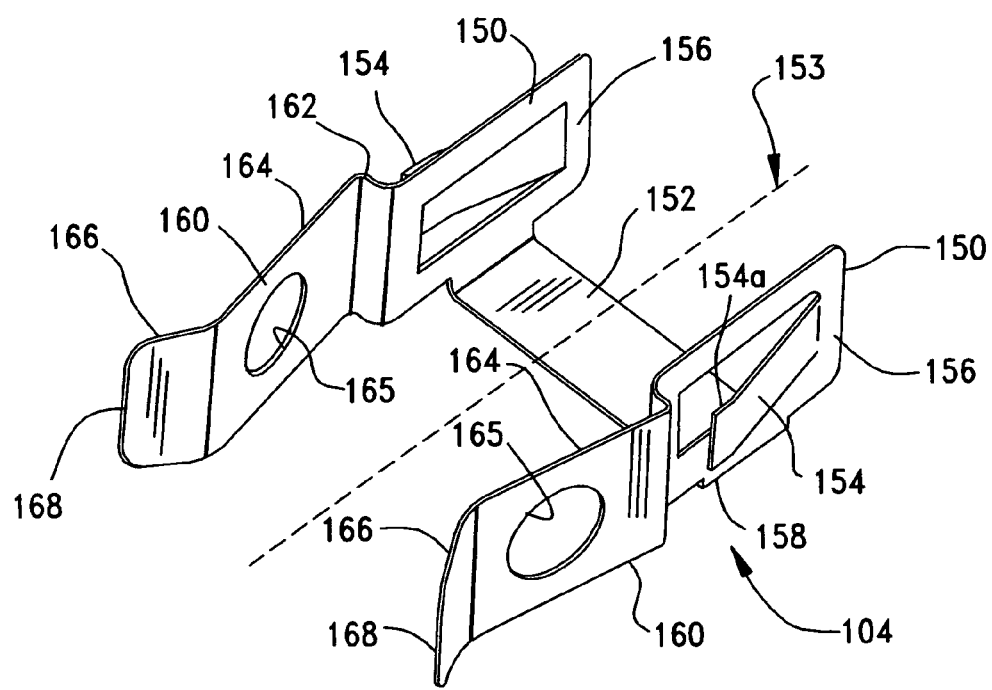
FIG. 7 is a front perspective view of the mounting plate of the adapter assembly of FIG. 5.

As best shown in FIG. 7, the mounting plate 104 includes upwardly extending legs 150 joined by a cross brace 152 to generally form a U-shape. The legs 150 are perpendicular to the cross brace 152 which is generally planar. A centerline 153 lies midway between the legs 150. A pair of latch arms 154 extend from legs 150 and are generally bent outwardly therefrom. Each latch arm 154 includes a fixed end 156 and an engaging edge 158. A portion 154a of each latch arm 154 proximate the engaging edge 158 is angled relative to the remainder of the latch arm 154 such that the portion 154a is approximately parallel to the remainder of the legs 150. The mounting plate 104 further includes, a generally S-shaped shoulder 162 provided at the end of each mating arm 160 and a deflectable mating arm 160 which extends forwardly from each shoulder 162 and terminates in a free end 168 where the mating arm 160 attaches to respective leg 150. Each mating arm 160 includes a first portion 164 and a second portion 166. The first portion 164 extends from the shoulder 162 to the second portion 166. The first portion 164 is angled inwardly toward the centerline 153. An aperture 165 is provided through the first portion 164 for engaging the interchangeable housing 106 as will be described herein. The second portion 166 extends forwardly from the first portion 164 and is angled outwardly away from the centerline 153. The mounting plate 104 is preferably stamped and formed from sheet metal.

The mounting plate 104 is mounted to the permanent housing 102 by snap-fitting the legs 150 of the mounting plate 104 into the recesses 136 in the side walls 128 of the housing base 108 while the cross brace 152 is snap-fit into the recess in the bottom wall 126 of the permanent housing 102. As shown in FIG. 8, when the mounting plate 104 is mounted to the permanent housing 102, the latch arms 154 project outwardly from the side walls 128 of the base 108 of the permanent housing 102 and a portion of the shoulders 162 engage the side walls 128 at the mating end 120 of the permanent housing 102. The assembled permanent housing 102 and mounting bracket 104 provide a base assembly 180 for mounting in a panel opening.

The base assembly 180 is mounted in the panel by first positioning the base assembly 180 near a front side of the panel and passing the rear end 118 of the base 108 of the permanent housing 102 through the panel opening. As the user continues to pass the base assembly 180 through the opening, the latch arms 154 of the mounting bracket 104 are biased inwardly by the walls surrounding the panel opening. Upon clearing the panel opening, latch arms 154 spring outwardly, and the engaging edges 158 of the latch arms 154 contact the rear side of the panel to secure the base assembly 180 within the panel opening. With the base assembly 180 positioned within the panel opening, a portion of the shoulders 162 and the mating arms 160 of the mounting bracket 104 extend from the front side of the panel for receiving the interchangeable housing 106. Thus, permanent housing 102 remains mounted in the panel opening while interchangeable housings 106 are mated to the permanent housing 102 and removed from the permanent housing 102.

As best shown in FIG. 6, the interchangeable housing 106 includes a base 170 defining a receptacle for receiving a connector to be mated with the connector received by the permanent housing 102. Interchangeable housing 106 includes upper and lower flanges 172 which provided abutting surfaces 174 for mating with the abutting surfaces 134 of the flanges 132 of the permanent housing 102. Side walls 175 are provided on opposite sides of the base 170 and are generally perpendicular to the abutting surfaces 174. Projections 176 extend outwardly from the side walls 175 for engaging the mounting plate 104 as will be described herein. The projections 176 are generally cylindrically-shaped with a tapered outer end. The interchangeable housing 106 may be die cast of metal for enhanced EMI protection or may be plastic. Interchangeable housing 106 is designed to receive an SC type connector.

An alternative interchangeable housing 182 which can be mated with the permanent housing 102 is shown in FIG. 9. The interchangeable housing 182 includes a receptacle 190 which receives an ST type connector which mates with a connector provided in the permanent housing 102. The interchangeable housing 182 include flanges 184 (only one of which is shown) which provides abutting surfaces 186 for abutting surface 134 of the permanent housing 102 upon mating the permanent and interchangeable housings 102, 182. Sidewalls 185 are provided on either side of the receptacle 183. Projections 188 extend outwardly from the sidewalls 185 for engaging the apertures 165 through the mating arms 160 of the mounting plate 104.

An additional alternative interchangeable housing 192 is shown in FIG. 10. The interchangeable housing 192 includes a receptacle 200 which receives an FC type connector. Interchangeable housing 192 include flanges 194 which provides abutting surfaces 196 for abutting surface 134 of the permanent housing 102 upon mating the permanent and interchangeable housings 102, 192. Sidewalls 195 are provided on either side of the receptacle 200. Projections 198 extend outwardly from the side walls 195 for engaging the apertures 165 through the mating arms 160 of the mounting plate 104. Upon mating of the permanent housing 102 and the interchangeable housing 192, the second split sleeve holder 116 of the permanent housing 102 will extend into receptacle 200.

With the base assembly 180 mounted within the panel opening, the user may select an interchangeable housing to mate with the permanent housing 102.

To mate the housings 102, 106, the interchangeable housing 106 is positioned between the deflectable mating arms 160 of the mounting bracket 104 and moved rearwardly toward the panel. As the interchangeable housing 106 is moved toward the panel, the mating arms 160 of the mounting bracket 104 spread outwardly as the projections 176 of the housing 106 engage the interior surfaces of the mating arms 160. Upon alignment of the projections 176 of the interchangeable housing 106 within the apertures 165 of the mating arms 160, the matings arms 160 snap back inwardly to securely mate the interchangeable housing 106 to the permanent housing 102. With the projections 176 positioned within the apertures 165, the abutting wall 174 of the interchangeable housing 106 abuts the abutting wall 134 of the permanent housing 102.

To mate the housings 102, 182, the interchangeable housing 182 is positioned between the mating arms 160 of the mounting bracket 104 and moved rearwardly toward the panel. As the interchangeable housing 182 is moved toward the panel, the mating arms 160 of the mounting bracket 104 spread outwardly as the projections 188 of the housing engage the interior surfaces of the mating arms 160. Upon alignment of the projections 188 of the interchangeable housing 182 within the apertures 165 of the mating arms 160, the mating arms 160 snap back inwardly to securely mate the interchangeable housing 182 to the permanent housing 102. With the projections 188 positioned within the apertures 165, the abutting wall 186 of the interchangeable housing 182 abuts the abutting wall 134 of the permanent housing 102.

To mate the housings 102, 192, the interchangeable housing 192 is positioned between the mating arms 160 of the mounting bracket 104 and moved rearwardly toward the panel. As the interchangeable housing 192 is moved toward the panel, the mating arms 160 of the mounting bracket 104 spread outwardly as the projections 198 of the housing engage the interior surfaces of the mating arms 160. Upon alignment of the projections 198 of the interchangeable housing 192 within the apertures 165 of the mating arms 160, the mating arms 160 snap back inwardly to securely mate the interchangeable housing 192 to the permanent housing 102. With the projections 198 positioned within the apertures 165, the abutting wall 196 of the interchangeable housing 192 abuts the abutting wall 134 of the permanent housing 102.

Figure 11:
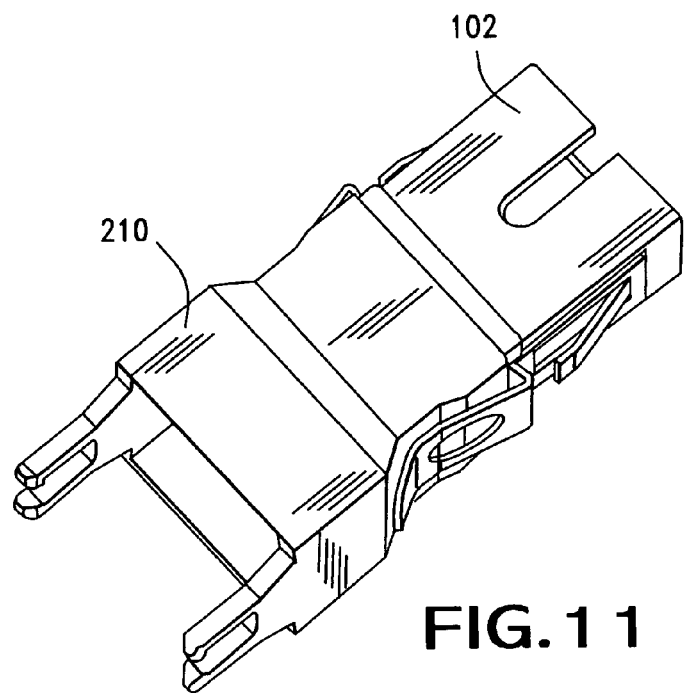
FIG. 11 is a front perspective view of the base assembly of FIG. 8 with a dust cap mounted thereto.

In the event the permanent housing 102 has been installed in the opening of the panel and no interchangeable housing 106, 182, 192 is to be mated with the permanent housing 102, a dust cap 210, as shown in FIG. 11 can be mated with the permanent housing 102 to prevent debris from contacting the permanent housing 102 or the connector positioned withing the receptacle 122, to protect the alignment sleeve 112 of the permanent housing 102 from being damaged when not in use, and/or to protect the permanent housing 102 during shipping.

Figure 12:
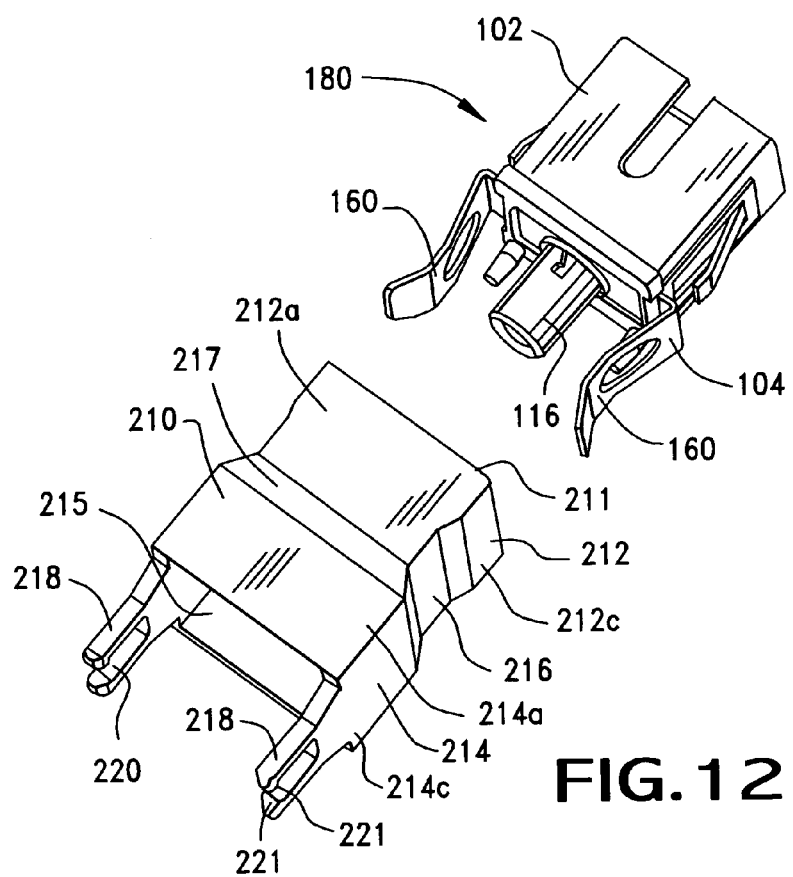
FIG. 12 is a front exploded perspective view of the base assembly and dust cap of FIG. 11.

As best shown in FIG. 12, the dust cap 210 has a generally rectangular cross-section. The dust cap 210 includes a first portion 212 defining a first receptacle 213 (see FIG. 13), a second portion 214 defining a second receptacle 215 and a tapered portion 217 joins the first portion 212 to the second portion 214. The second portion 214 is larger than the first portion 212. When an interchangeable housing is not mated to the permanent housing 102, the dust cap 210 can be mated with the permanent housing 102 such that the split sleeve holder 116 is positioned within the first receptacle 213 and a mating surface 211 abuts the mating surface 134 of the permanent housing.

The first portion 212 of the dust cap 210 includes a top wall 212a, a bottom wall (not shown), and sidewalls 212c. A recess 216 is provided in each sidewall 212c of the dust cap 210 proximate the tapered portion 217. The recess 216 receives the latch arms 160 of the mounting bracket 104 and maintains engagement between the base assembly 180 and the dust cap 210.

The second portion 214 of the dust cap 210 includes a top wall 214a, a bottom wall (not shown) and sidewalls 214c. Removal fingers 218 extend from the sidewalls 214c of the second portion 214 in the opposite direction of the first portion 212. The recess 215 is defined by the interior surfaces of the top wall 214a, the bottom wall, and the sidewalls 214c. The sidewalls 214c and the top wall 214a and bottom wall are spaced apart such that the recess 215 defined by the interior surfaces of the walls can receive any one of the interchangeable housings. The removal fingers 218 and the sidewalls 214c are generally co-planar. The removal fingers 218 define notches 220. Inwardly directed bumps 221 are provided at the end of each finger 218. The dust cap 210 is preferably made from plastic.

Figure 13:
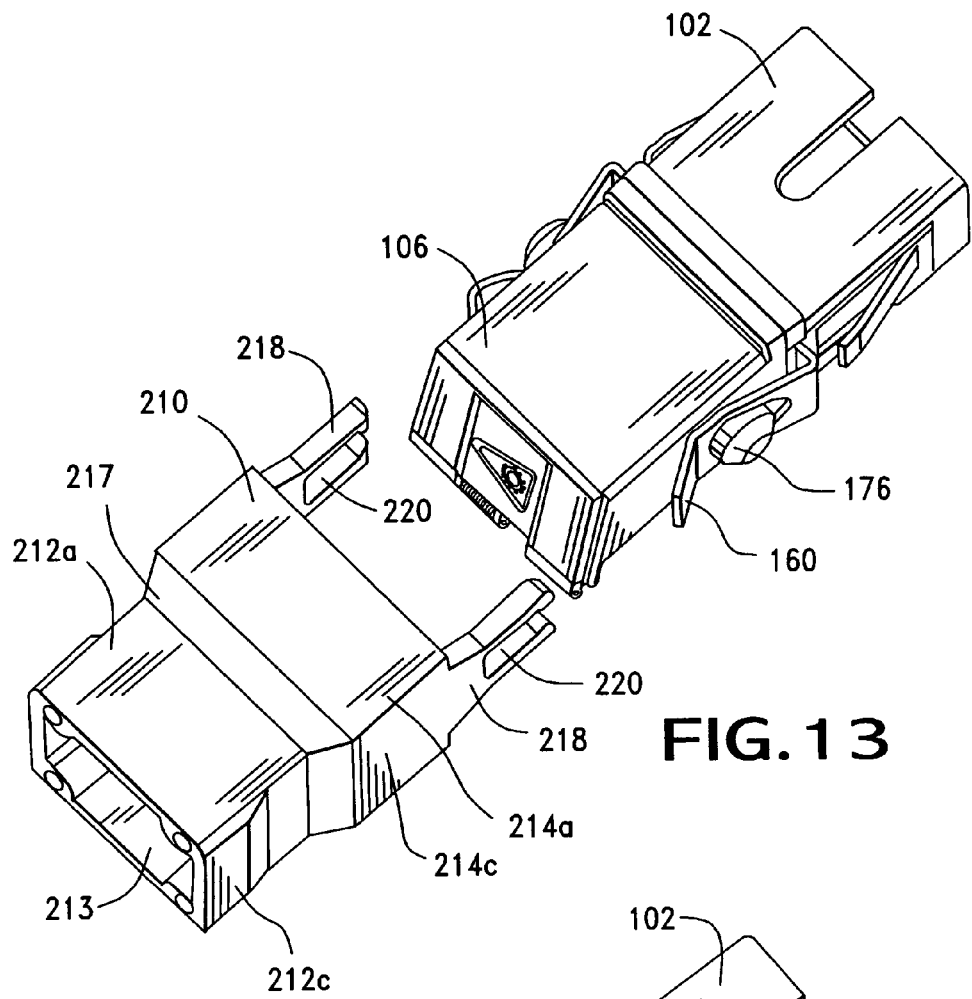
FIG. 13 is a front perspective view of the adapter assembly of FIG. 5 with a dust cap positioned to remove the interchangeable housing.
Figure 14:
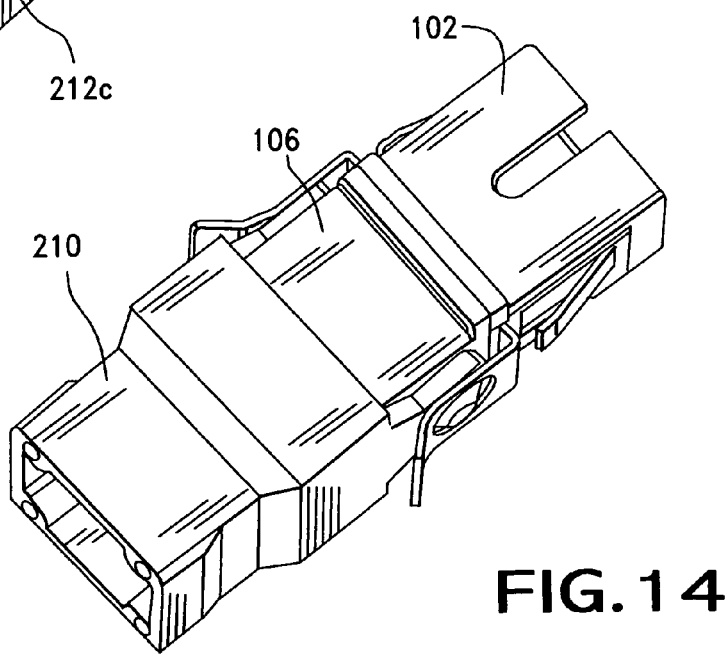
FIG. 14 is a front perspective view of the adapter assembly of FIG. 5 with the dust cap engaged with the interchangeable housing.
Figure 15:
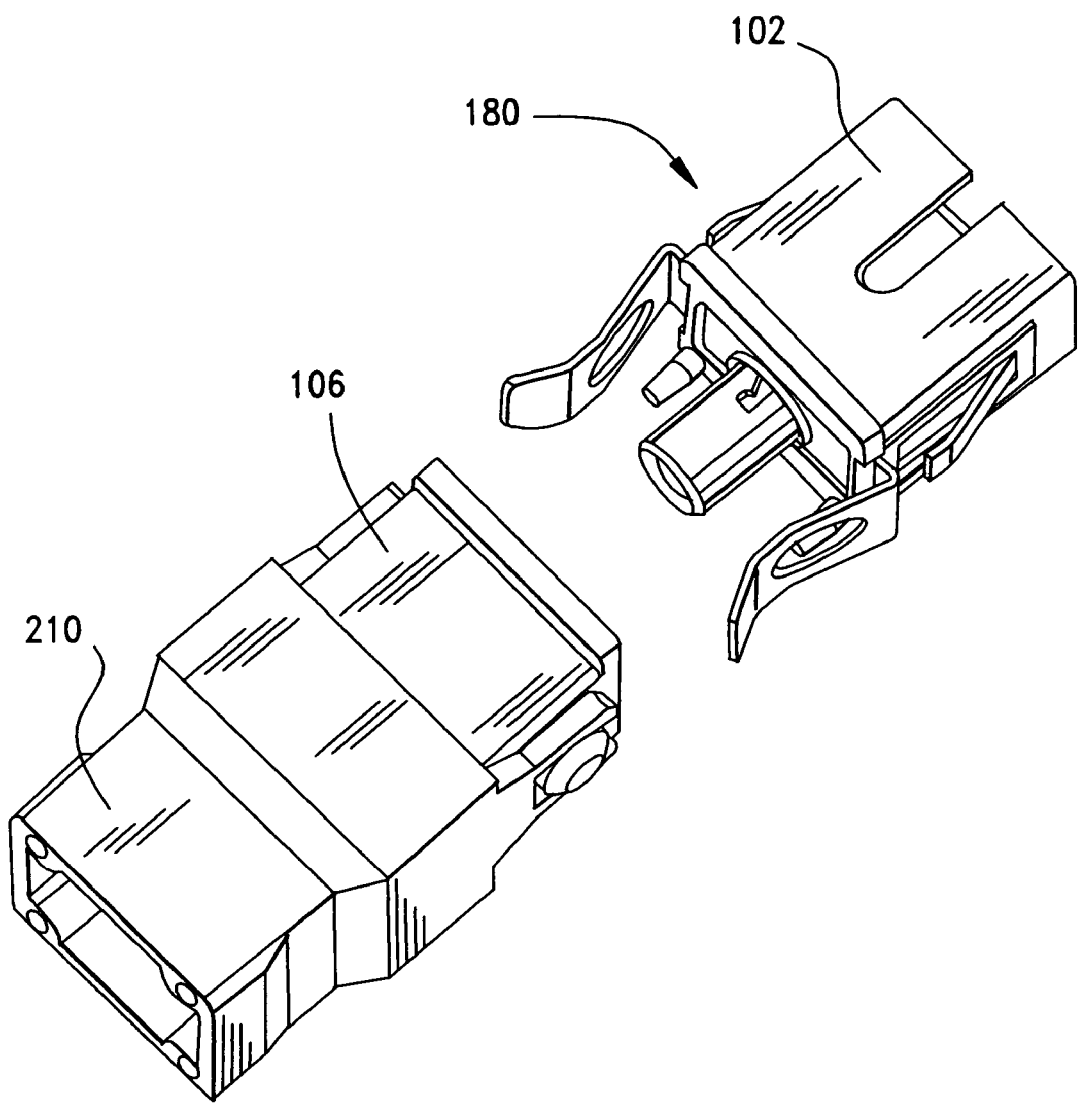
FIG. 15 is a front perspective view of the adapter assembly of FIG. 5 with the dust cap engaged with the interchangeable housing and removed from the base assembly.

As shown in FIGS. 13–15, the dust cap 210 can be used as a tool to disengage and one of the interchangeable housings from the permanent housing 102. The disengagement is described in relation to the interchangeable housing 106 with the understanding that interchangeable housings 182, 192 could be disengaged from the permanent housing 102 in the same manner. To use the dust cap 210 as a removal tool, the user orientates the dust cap 210 such that the fingers 218 are directed toward the interchangeable housing 106 and aligns the fingers 218 proximate the sidewalls 175 proximate the sidewalls 175 of the interchangeable housing 106. As the user moves the dust cap 210 rearwardly, the fingers 218 slide between the side walls 175 and the mating arms 160, and engage the mating arms 160 of the mounting bracket 104, and the mating arms 160 are spread outwardly. Continued movement of the dust cap 210 rearwardly causes the bumps 221 on the fingers 218 to engage the projections 176 of the interchangeable housing 106. As the user continues to move the dust cap 210 toward the permanent housing 102, the interchangeable housing 106 enters the receptacle 215 defined by the second portion 214 of the dust cap 210 and the engagement between the projections 176 and the fingers 218 cause the fingers 218 to spread upwardly and downwardly such that the fingers 218 extend over and under the projections 176 of the interchangeable housing 106. Upon placement of the projections 176 of the interchangeable housing 106 within the notches 220 of the dust cap 210, the fingers 218 "grasp" the projections 176. As shown in FIG. 15, as the dust cover 116 is pulled toward the user, the interchangeable housing 106 remains engaged with the dust cover 210 and is no longer mated to the permanent housing 102. The user may then select an alternative interchangeable housing to mount to the permanent housing 102. Alternatively if no interchangeable housing is to be mated to the permanent housing 102, the user may mate the dust cover 210 with the base assembly 180 to protect the permanent housing 102 as discussed herein.

As shown in the FIGS. 5–15 and described above, no latch mechanisms between the permanent housing 102 and the interchangeable housing 106 are required to mate the housings 102, 106. Rather, mating of the housings 102, 106 is accomplished by simply abutting the housings 102, 106 and securing the housing 102, 106 in the abutted position by way of the mounting plate 104. This arrangement allows the permanent and interchangeable housings 102, 106 to be easily mated. The adapter 100 provides a standard base assembly 180 such that the user can change the interchangeable adapter housings 106, 182, 192 without removing the permanent housing 102 or the mounting bracket 104 from the panel. Thus, a variety of interchangeable housings can be mated with the permanent housing 102 without accessing the rear side of the panel in which the base assembly 180 is housed.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A base assembly for mounting in an opening in a panel comprising:
   a first housing projecting from the panel and having a first receptacle for receiving at least one connector; and
   a mounting plate secured to said first housing, wherein said mounting plate includes mating arms for receiving a second housing and wherein said first housing is secured to the panel by said mounting plate, said mounting plate further including a cross brace and two legs generally perpendicular to said cross brace defining a center line of said mounting plate, said mating arms of said mounting plate extending from said legs, said mounting plate further including shoulders between said legs and said mating arms to offset said legs and said mating arms,
   wherein each of said mating arms includes a first portion extending from said shoulder and a second portion extending from said first portion, said first portion of said mating arms angled toward the center line and said second portions of said mating arms are angled away from said center line.

2. The base assembly of claim 1, wherein said mounting plate includes outwardly extending latch arms for securing said first housing in the panel.

3. The base assembly of claim 1, wherein apertures are provided through said mating arms for acceptance of projections on the second housing.

4. The base assembly of claim 1, wherein said first housing includes a recess for receiving a portion of said mounting plate.

5. The base assembly of claim 4, wherein said mounting plate is secured to said first housing by snap-fitting a portion of said mounting plate to said first housing.

6. The base assembly of claim 1, wherein said first housing is die cast metal.

7. A base assembly for mounting in an opening in a panel comprising:
- a first housing projecting from the panel and having a first receptacle for receiving at least one connector;
- a mounting plate secured to said first housing, wherein said mounting plate includes mating arms for receiving a second housing and wherein said first housing is secured to the panel by said mounting plate; and
- a dust cap mounted within said mating arms of said mounting plate, wherein said dust cap includes fingers for removing the second housing from said mating arms.

8. The base assembly of claim 7, wherein said fingers form notches and each said finger further includes a bump directed toward said notch.

9. An adapter assembly for mounting in an opening in a panel comprising:
- a base assembly including a first housing projecting from the panel and having a first receptacle for receiving at least one connector; a mounting plate secured to said first housing, said mounting plate including mating arms and said first housing is secured to the panel by said mounting plate;
- a second housing mounted within said mating arms of said mounting plate having a second receptacle for receiving a complementary connective device for mating with the connector within the base assembly, said mating arms of said mounting plate further include apertures and said second housing further include projections for engagement with said apertures in said mating arms of said mounting plate; and
- a dust cap, wherein said dust cap includes fingers for engaging said projections of said second housing.

10. The adapter assembly of claim 9, wherein said first housing is die cast and said second housing is plastic.

11. The adapter assembly of claim 9, wherein said fingers define notches and wherein each finger further includes a bump for engaging the projections of the second housing.

* * * * *